United States Patent
Mori

[11] Patent Number: 5,962,121
[45] Date of Patent: Oct. 5, 1999

[54] RETROREFLECTIVE SHEET COMPRISING MICROSPHERES, THE DIAMETER AND REFRACTIVE INDEX OF WHICH BEING SPECIFICALLY RELATED TO THE REFRACTIVE INDICES OF LAYERS DIRECTLY IN CONTACT THEREWITH

[75] Inventor: Yutaka Mori, Shizuoka pref., Japan

[73] Assignee: 3M Innovative Properties Company, St. Paul, Minn.

[21] Appl. No.: 08/989,504

[22] Filed: Dec. 12, 1997

[30] Foreign Application Priority Data

Dec. 12, 1996 [JP] Japan ................................. 8-332109

[51] Int. Cl.$^6$ .................................................... B32B 5/16
[52] U.S. Cl. .......................... 428/323; 359/170; 428/333; 428/343; 428/913
[58] Field of Search ............................. 428/323, 333, 428/343, 913; 359/170

[56] References Cited

U.S. PATENT DOCUMENTS

| | | | |
|---|---|---|---|
| 3,700,305 | 10/1972 | Bingham | 350/350 |
| 3,758,192 | 9/1973 | Bingham | 350/350 |
| 3,795,435 | 3/1974 | Schwab | 350/350 |
| 3,801,183 | 4/1974 | Sevelin et al. | 350/350 |
| 4,082,426 | 4/1978 | Brown | 350/40 |
| 4,293,189 | 10/1981 | Morikawa | 350/350 |
| 4,392,901 | 7/1983 | Pernicano et al. | 156/156 |
| 4,401,494 | 8/1983 | Pernicano et al. | 156/156 |
| 4,505,967 | 3/1985 | Bailey | 428/350 |
| 4,648,932 | 3/1987 | Bailey | 156/156 |
| 4,663,182 | 5/1987 | Fernandex | 427/427 |
| 4,763,985 | 8/1988 | Bingham | 350/350 |
| 4,766,032 | 8/1988 | Pernicano | 428/428 |
| 5,017,262 | 5/1991 | Riesing | 156/156 |
| 5,035,920 | 7/1991 | Smrt et al. | 427/427 |
| 5,503,906 | 4/1996 | Olsen | 428/428 |

FOREIGN PATENT DOCUMENTS

| | | |
|---|---|---|
| 0 203-752 A2 | 12/1986 | European Pat. Off. . |
| 0 305 074 | 3/1989 | European Pat. Off. . |
| 0 348 669 | 1/1990 | European Pat. Off. . |
| 0 404-539 A2 | 12/1990 | European Pat. Off. . |
| 0 704 719 A2 | 4/1996 | European Pat. Off. . |
| 0 747-736 A1 | 12/1996 | European Pat. Off. . |
| S-60-128401 | 7/1985 | Japan . |
| 62-65769 | 3/1987 | Japan . |
| 2-140703 | 5/1990 | Japan . |
| H 2-35074 | 8/1990 | Japan . |
| H2-54922 | 11/1990 | Japan . |
| 3-53232 | 3/1991 | Japan . |
| 5-45507 | 2/1993 | Japan . |
| 6-78076 | 11/1994 | Japan . |
| WO 9425666 | 11/1994 | WIPO . |
| WO 96/17263 | 6/1996 | WIPO . |

*Primary Examiner*—Hoa T. Le
*Attorney, Agent, or Firm*—Robert H. Jordan

[57] ABSTRACT

A retroreflective sheet capable of exhibiting an excellent decorative effect during both daytime and nighttime, and particularly an excellent rainbow-colored decorative effect. The sheet comprises, in order, a binder in the back side of which a plurality of microspheres, arranged in a monolayer, are partially embedded, a focusing layer underlying some of the microspheres, and a reflective layer underlying the focusing layer and underlying microspheres which do not have a focusing layer therebehind. The focusing layer has a film thickness selection coefficient x in the range of 0.16 to 0.95 as defined by equation (II) of the following equations (I) and (II):

$$f = \frac{n_s(n_g - 2n_b)}{2[n_b(n_s - n_g) + n_s(n_b - n_g)]} \quad (I)$$

$$x = \frac{h}{df} \quad (II)$$

wherein f is the coefficient for the optimum layer thickness of the layer, d is the diameter of the microspheres, h is the thickness of the focusing layer, $n_b$ is the refractive index of the binder layer, $n_g$ is the refractive index of the microspheres, and $n_s$ is the refractive index of the focusing layer.

5 Claims, 4 Drawing Sheets

RETROREFLECTIVE SHEET COMPRISING MICROSPHERES, THE DIAMETER AND REFRACTIVE INDEX OF WHICH BEING SPECIFICALLY RELATED TO THE REFRACTIVE INDICES OF LAYERS DIRECTLY IN CONTACT THEREWITH

FIELD OF INVENTION

The present invention relates to an enclosed-lens retroreflective sheet that is particularly well-suited for decorative purposes, e.g., labels, stickers, emblems, and related products, and advertising signs.

BACKGROUND

Many different varieties of retroreflective sheets (sometimes referred to as being "light-retroreflective" or as "sheetings") have been proposed and marketed in the past for a variety of purposes.

Retroreflective sheets are perhaps most commonly used for safety purposes, specifically for road signs and as stickers, emblems, and medallions for vehicles, e.g., bicycles and automobiles, and personal articles, e.g., clothing, bags, etc. In such applications, it is typically desired that the sheet provide very strong retroreflective brightness for particular observers, e.g., drivers of approaching vehicles. As a result, such sheets are typically constructed to minimize light dispersion such that incident light is reflected only in the narrow range in the direction of the light source, i.e., retroreflection. Because of this, such sheets are readily illuminated by approaching vehicles with headlights in operation, making them most readily visible to occupants of those vehicles, but are not as effectively illuminated by other light sources. For example, when the light source is the sun, a street lamp, or indoor lighting, light retroreflected light by the sheet is not readily recognized or detected by most observers except for those who happen to positioned substantially adjacent the path of the light from the illumination source to the sheet. This problem is particularly relevant in the case of street advertisements, storefronts and window displays, station signs and other various decorative and related purposes other than for the safety purposes.

A decorative film suited for such uses as signs and traffic safety equipment is disclosed in Japanese Unexamined Patent Publication (Kokai) No. 5-45507. As shown in FIG. 1, this decorative film comprises protective layer 36, glass beads or microspheres 32 partially embedded in protective layer 36 and binder 31, reflective thin film 33, support layer 35, adhesive layer 37, and release liner 38. The thickness of binder 31 varies. Glass beads 32 have a diameter of about 500 microns ("$\mu$m") or lower, a refractive index of 2.0 or higher, and an embedding ratio in anchoring binder 31 to about 10 to about 80 percent of their diameter. Reflective thin film 33 consists of a metal vapor deposited thin film which contacts glass beads 32 in depressions 34. These decorative sheets have the effect of changing color tone depending on the angle viewed under constant light irradiation, and shining beautifully in a rainbow dispersion spectrum. However, the sheets are limited to retroreflection of light which is incident at angles within a relatively narrow incidence angle range, and thus it has been difficult to obtain its excellent decorative effect at other incidence angles.

Examples of retroreflective sheets with similar decorative effects are the retroreflector described in Japanese Unexamined Patent Publication (Kokai) No. 2-54922 and the retroreflective sheet material described in U.S. Pat. No. 5,503, 906. Both of these references disclose a patterned decoration to be formed by providing a transparent or colored resin layer over parts of the front or back side of an exposed-bead reflective sheet. Although such sheets can provide colored retroreflection, they do not provide rainbow decoration.

Patterned or selective reflected light may be obtained by the method for producing a retroreflective pattern described in Japanese Unexamined Patent Publication (Kokai) No. 60-128401. According to this approach, the reflective coating side of the reflective sheet is contact bonded to an adherend partially coated with an adhesive in a pattern, and only those sections serve as the retroreflective sections. However, as with the technique described above, rainbow decoration cannot be achieved.

In addition, the vehicle reflector described in Unexamined Utility Model Publication (Kokai) No. 6-78076, the sheet with a retroreflective side described in Japanese Unexamined Patent Publication (Kokai) No. 2-140703, and the method for producing a retroreflective sheet described in Japanese Unexamined Patent Publication (Kokai) No. 48-72290 represent techniques for achieving wide angle retroreflection, i.e., the capability of retroreflection even when the incident angle relative to the sheet is relatively acute. That is, these techniques allow retroreflection across a wide range of angles by causing light to be retroreflected by sheet 10 when incident at an acute angle $\theta_1$, $\theta_2$ with respect to sheet 10 as shown in the attached FIG. 2.

U.S. Pat. No. 3,801,183 discloses retroreflective films bearing retroreflective legends and backgrounds that comprise, in part, a discontinuous varnish layer.

The need exists for retroreflective sheets that provide effective retroreflective effect over a wide variety of incidence angles and that also provide decorative effects that are visible under a variety of viewing conditions.

SUMMARY OF INVENTION

The present invention provides a retroreflective sheet that exhibits a desirable combination fo properties.

In brief summary, retroreflective sheets of the invention comprise, in order, a binder in the back side of which a plurality of microspheres, arranged in a monolayer, are partially embedded, a focusing layer underlying some of the microspheres in desired fashion, and a reflective layer underlying the focusing layer and underlying microspheres which do not have a focusing layer therebehind. The focusing layer has a film thickness selection coefficient x in the range of 0.16 to 0.95, preferably 0.32 to 0.80, as defined by equation (II) of the following equations (I) and (II):

$$f = \frac{n_s(n_g - 2n_b)}{2[n_b(n_s - n_g) + n_s(n_b - n_g)]} \quad \text{(I)}$$

$$x = \frac{h}{df} \quad \text{(II)}$$

wherein f is the coefficient for the optimum layer thickness of the layer, d is the diameter of the microspheres, h is the effective thickness of the focusing layer, $n_b$ is the refractive index of the binder layer, $n_g$ is the refractive index of the microspheres, and $n_s$ is the refractive index of the focusing layer.

Sheets of the invention exhibit an excellent decorative effect irrespective of the time of day or night by having a different appearance depending on the observation angle. Sheets of the invention achieve this decorative effect by providing a decorative, retroreflective effect which changes color tones while shining beautifully in a rainbow dispersion spectrum, over a wide range of incidence angles. This provides a distinctive effect that is of particular utility for purposes of decoration or advertising.

Sheets of the invention are capable of exhibiting effective retroreflectivity over a wide observation angle, i.e. for light irradiated within a wide range of incident angles, and also capable of being recognized without the retroreflectivity being dependent on the observation angle.

BRIEF DESCRIPTION OF DRAWING

The invention will be further explained with reference to the drawing, wherein.

These figures, which are idealized, are not to scale and are intended to be merely illustrative and non-limiting.

DETAILED DESCRIPTION OF ILLUSTRATIVE EMBODIMENTS

Figure 1:
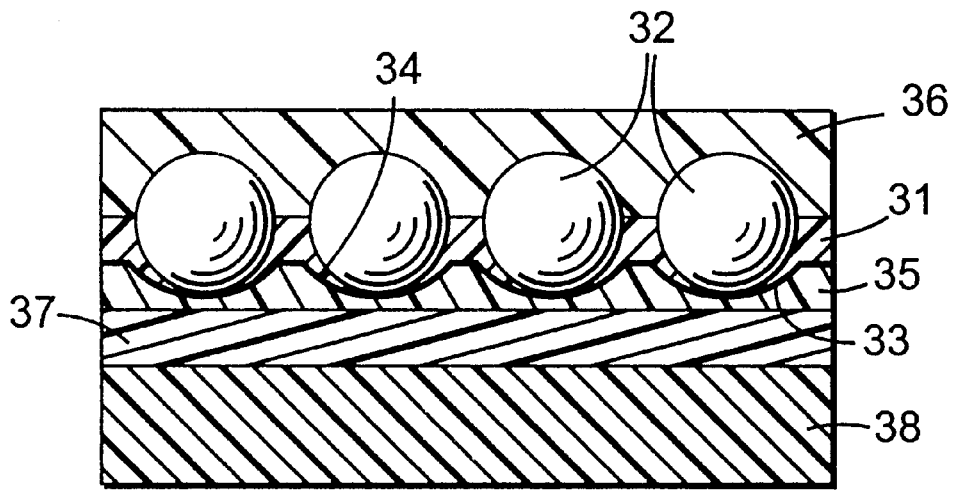
FIG. 1 is a cross-sectional view of an example of a retroreflective sheet of the prior art.
Figure 2:
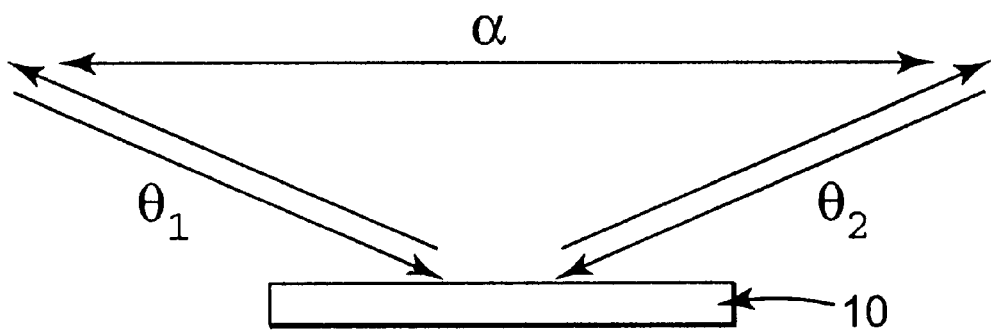
FIG. 2 is a schematic illustration showing wide angle reflection with a retroreflective sheet.
Figure 3:
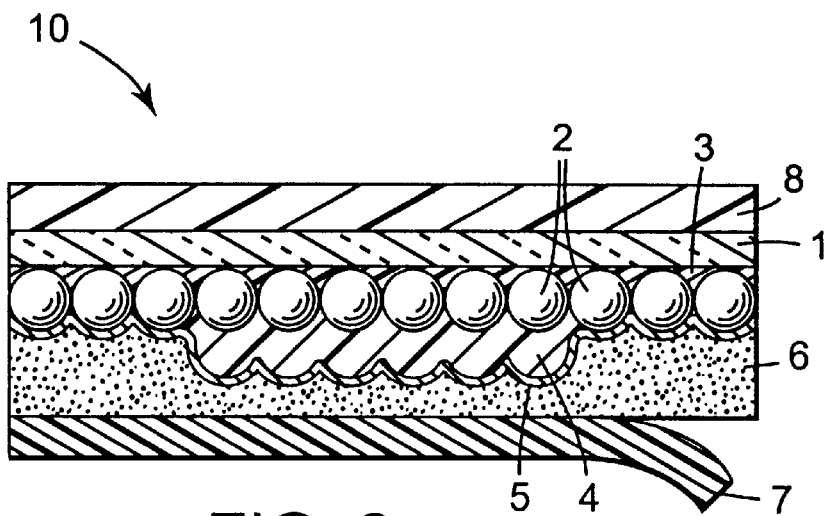
FIG. 3 is a cross-sectional view of a portion of an illustrative retroreflective sheet of the invention.

FIG. 3 is a cross-sectional view of one preferred embodiment of a retroreflective sheet of the invention. As shown in this drawing, retroreflective sheet 10 comprises binder layer 3 in the back side of which a plurality of microspheres 2, arranged in a monolayer, are partially embedded, focusing layer 4 underlying at least some of microspheres 2, and reflective layer 5 underlying focusing layer 4. Sheet 10 further comprises on its rear or underlying side optional adhesive layer 6 covered by release liner 7 and further comprises on its front side optional cover film 1 and optional clear coat 8.

Binder layer 3 should be substantially transparent and may, if desired, be colored. It typically will comprise resin and preferably exhibits good adhesion to the other components of the sheet to which it is in contact, especially the microspheres and the focusing layer. Illustrative examples of suitable polymeric materials include, but are not limited to, urethane resins, epoxy resins and acrylic resins. The thickness of the binder layer will differ depending on a number of factors including the diameter of the microspheres embedded therein and the overall thickness of the retroreflective sheet. Typically the microspheres will be embedded to about 30 to 70 percent, and preferably about 40 to 60 percent, of their diameter.

The microspheres (sometimes referred to as "beads") are typically glass or ceramic, may comprise polymer or other suitable material, as is known to those skilled in the art. They are preferably substantially spherical and substantially uniform in size. Typically they preferably have a refractive index of about 2.20 to 2.30. Illustrative examples of suitable glass microspheres include, for example, those formed from, for example, BaO—ZnO—TiO$_2$ based glass. The diameter of the microspheres will differ depending on a number of factors including the thickness of the binder layer and the thickness of the reflective sheet, but is typically about 30 to 120 μm, and preferably about 50 to 100 μm.

Focusing layer 4 typically comprises resin, should be substantially transparent, and may be colored if desired. Also, it preferably exhibits good adhesion to the other components of the sheet to which it is in contact, e.g., the microspheres, the binder layer, and the reflective layer. It is formed in a pattern depending on the desired decorative effect, and is not placed on one side adjacent to consecutive glass beads 2 or in a continuous manner as in conventional retroreflective sheets.

The thickness of the focusing layer is determined by the formula represented by the aforementioned equations (I) and (II) which define the optimum thickness of the focusing layer so that the resultant sheet reflects only in the direction of the light source. In accordance with the invention, the film thickness selection coefficient x in equation (II) is in the range of 0.16 to 0.95.

The focusing layer typically has a refractive index of about 1.35 to 1.65. Illustrative examples of suitable polymeric materials that may be used for form focusing layers in accordance with the invention include, but are not limited to, polyvinyl butyral resins, urethane resins and epoxy resins.

As mentioned above, the focusing layer is formed in a desired pattern, being formed behind only some of the microspheres in a desired imagewise manner. This selective formation of the focusing layer may be accomplished by any of a variety of printing and coating techniques. One illustrative method is screen printing, e.g., silk screen printing. Depending on the desired pattern, the screen may be readily changed and its mesh size also readily controlled.

Retroreflective sheets of the present invention achieve an excellent graphic function, and therefore decorative function and especially a rainbow decorative effect, which was not possible with the prior art, through use of the patterned focusing layer. The thickness of the focusing layer may be selected to within a prescribed range to allow recognition of resultant retroreflection under both daytime and nighttime viewing conditions, and the range of effective observation angle may be increased to a wider range. In addition, by making parts of the focusing layer thinner than focusing layers of previously known enclosed-lens systems, it is possible to widen the observation angle of retroreflected light, while at the portions with no focusing layer, incident light produces a rainbow dispersion spectrum in a direction of 42° with respect to the incident light. Having both of these functions within the same sheet provides a decorative effect whereby the appearance changes depending on the observation angle.

On the rear side of focusing layer 4 as well as on the exposed rear sides of microspheres 2 and binder layer 3 in those portions not covered by focusing layer 4, reflective layer 5 is provided.

Reflective layer 5 may be formed by any suitable method, using any of a variety of reflective materials that are well known to those skilled in the art. The reflective layer is preferably formed as a vapor deposition coating or film of metal, or a coating of metal powder paint, particularly a resin which contains metal powders. In the latter case, the reflective layer may be formed by screen printing of the metal powder paint, in the similar manner as for formation of the focusing resin layer described above. The thickness of the reflective layer may be varied within a wide range depending on the composition and properties of the reflective layer, the properties of the adjacent glass bead bonding layer and focusing resin layer, and other factors, but it is typically about 2 to 20 μm, and preferably about 5 to 15 μm.

When the reflective layer is formed of a metal vapor deposition film, the vapor deposition may be accomplished by a common method of vapor depositing a metal such as aluminum or tin. A vapor deposited film of a metal such as aluminum or tin exhibits good adhesion with the focusing layer and adhesive layer when made to a film thickness of 300 Angstroms ("Å") or greater, and also displays a high reflectivity. When the reflective layer is formed of a metal powder paint, it is advantageous to use a paint which is a mixture of a metal powder such as aluminum and a resin material such as a polyvinyl butyral resin or urethane resin powder which can exhibit good adhesion with the focusing layer and adhesive layer. Such a paint may be readily applied using a screen printing method, such as mentioned above.

Typically retroreflective sheets of the invention will further comprise optional adhesive layer 6 and optional release liner 7 on the rear side thereof, e.g., on the rear side of reflective layer 5 as shown in the embodiment in FIG. 3. The adhesive should provide desired adhesion to the sheet and to the ultimate substrate or adherend (e.g., metals, plastics, wood, resin-painted surfaces and the like) to which the sheet is to be applied. Also, it preferably is capable of suitable forms of application and will preferably not degrade the other components of the sheet or the adherend. Illustrative examples include pressure-sensitive adhesives, chemically activated adhesives, heat-activated adhesives, etc. One example of a suitable class of adhesives is acrylic resin-based adhesives. The thickness of the adhesive layer is not particularly restricted, but is typically about 10 to 50 μm, and preferably about 20 to 40 μm.

It may be often desired to also provide a cover film or support layer 1 on the front side of binder layer 3. Such a film can impart increased strength and robustness to the resultant sheet as well as provide some means of protection for the underlying components of the sheet, e.g., as a medium in which ultraviolet absorbers are dispersed. The cover film is preferably substantially transparent, may be colored if desired, and should adhere well to the underlying binder layer. In many embodiments, the characteristics of the cover film will in large part determine the flexibility and elasticity of the resultant retroreflective sheet.

Illustrative examples of materials which can be used as the cover film include such polymeric materials as polyvinyl chloride (PVC), polyurethane, polyethylene terephthalate (PET), polymethyl methacrylate, and the like. The thickness of the cover film is not especially restricted and is dependent in large upon the physical properties which it is desired to achieve. Typically the thickness of the cover film is about 20 to 150 μm, and preferably about 40 to 100 μm.

In some embodiments, sheet 10 will further comprise clear coat 8 on the front surface of thereof, e.g., over cover film 1, if present, or on the front surface of binder layer 3. Clear coat 8 can be used to achieve desired weather resistance and waterproofness, provide a means for protecting graphic indicia applied to the front surface(s) of cover film 1 and/or binder layer 3, provide a surface suitable for application of graphic indicia thereto, impart a glossy appearance, etc. Clear coat 8 should be substantially transparent and may be colored if desired. Illustrative examples of suitable clear coat materials include those with excellent adhesion with the underlying components of the sheet such as colorless paints which include thermosetting urethane paints, ultraviolet curable paints, and fluororesin paints. The thickness of the clear coat is not particularly restricted, but is normally about 10 to 100 μm, and preferably about 20 to 50 μm.

The above explanation does not describe in detail the method of forming the layers composing the light retroreflective sheet of the invention, but unless otherwise specified, the same techniques commonly used in the technical field may be employed or modified as necessary for the invention. In addition to screen printing which was mentioned as being advantageous for formation of the focusing resin layer, suitable techniques also include other printing methods, as well as coating methods such as knife coating and spray coating.

It will now be shown that when the microsphere refractive index $n_g$ and diameter d, the binder layer refractive index $n_b$ and the focusing layer refractive index $n_s$ of the light retroreflective sheet of the invention are known, then the focusing layer thickness h may be calculated from equations (I) and (II) given above. This is explained with reference to FIG. 4.

Figure 4:
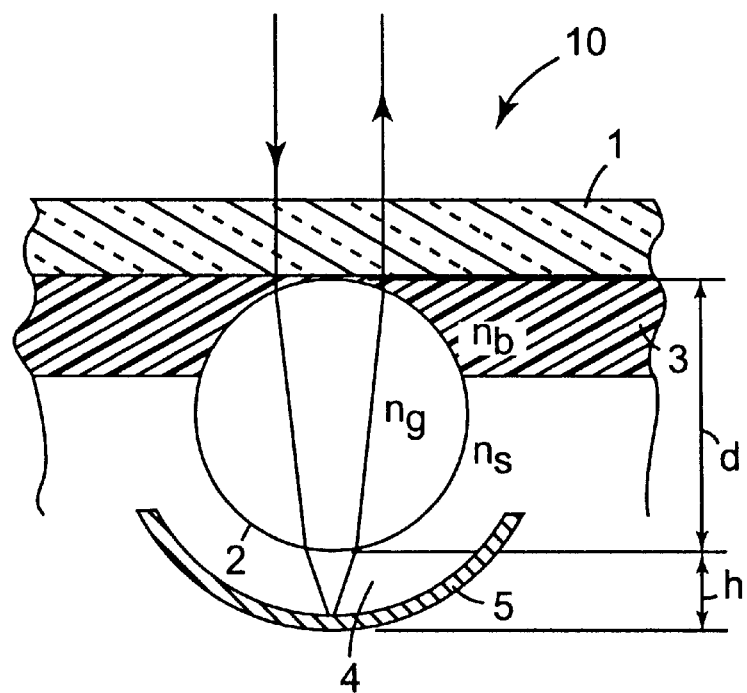
FIG. 4 is a cross-sectional view of the area around a microsphere in the retroreflective sheet shown in FIG. 3.

In FIG. 4, microspheres 2 having a refractive index $n_g$ and diameter d are embedded binder layer 3 having a refractive index $n_b$, while focusing layer 4 with a refractive index $n_g$ surrounds the back side thereof at a prescribed thickness h with reflective layer 5 therebehind. As shown by the light ray tracing (arrows) in the drawing, light incident to reflective sheet 10 and penetrating through microspheres 2 may thus be retroreflected. Cover film 1 is essentially irrelevant to the calculation of the film thickness selection coefficient x so long as it has a substantially uniform thickness.

As an example, if d (microsphere diameter) is 80 μm, $n_b$ (binder layer refractive index) is 1.487, $n_g$ (microspheres refractive index) is 2.175 and $n_s$ (focusing layer refractive index) is 1.472, then equation (I) may be used to derive the following equation to obtain f (optimum focusing layer thickness coefficient)=0.2857.

$$f = \frac{1.472(2.175 - 2(1.487))}{2[1.487(1.472 - 2.175) + 1.472(1.487 - 2.175)]}$$

$$f = \frac{-1.472 \times 0.799}{-4.1162}$$

$$f = \frac{1.1761}{4.1162} = 0.2857$$

Also, since h=d·f and d (the glass bead diameter) is 80 μm as stated above, h (the focusing resin layer thickness) may be in turn calculated by the following equation.

h=d·f=0.080×0.2857=0.0229 (mm)

In other words, the optimum focusing layer thickness is about 23 μm.

In accordance with the present invention, the film thickness selection coefficient x of the focusing layer which controls the outward radiation of retroreflected light, which is defined based on the conditions specified for typical conventional light retroreflective sheet used for safety purposes, or specifically by the aforementioned equations (I) and (II), is made smaller than 1.00 and thus much smaller than according to the prior art, i.e., a thinner focusing resin layer is provided, to thus allow recognition of retroreflected light at a wider observation angle. Furthermore, the widened observation angle of retroreflected light allows recognition of retroreflected light even under daylight, while patterning of the focusing resin layer allows an excellent rainbow decoration to be combined with the brightness, since the sections with no focusing layer in contact with the underside of the microspheres act as a prism. In fact, as the thickness of the focusing layer is reduced, reflected light radiates out at an ever increasing angle, and when the thickness reaches zero the reflected light can produce a rainbow dispersion spectrum in a direction of about 42° with respect to the incident light.

The brightness of reflected light is reduced as it radiates at a wider angle, making it harder to be recognized by observers, whereas narrower angles cause the incident light from light sources to be blocked by the observer, thus rendering it difficult to recognized the reflected light, particularly when the light source is the sun, a street lamp, indoor lights, etc. However, based on the findings of the present inventors, when the film thickness selection coefficient x is in the range of 0.16 to 0.95 in equations (I) and (II) which define the thickness of the focusing layer, reflected light may be easily recognized even under light sources such as the sun.

In addition, it also became clear that the above-mentioned decorative effect and wide-angle observation effect are more effectively exhibited when a printing method, and especially screen printing, is used for formation of the focusing layer and if necessary for formation of the adjacent reflective layer. When using a light retroreflective sheet according to the invention, a single reflective sheet is able to combine retroreflected light, rainbow light and colorlessness, and is therefore highly suitable for decorative purposes.

Figure 5A:
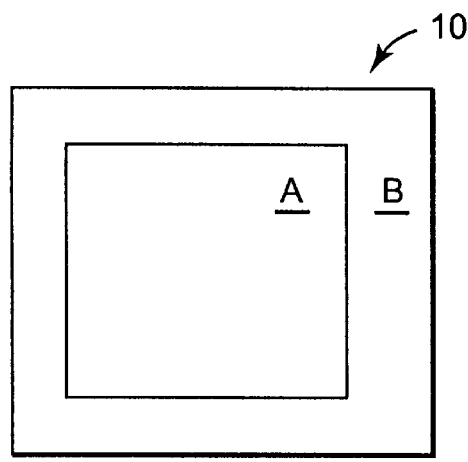
FIG. 5A shows a plan view and FIG. 5B shows a schematic cross-sectional view of a retroreflective sheet of the invention used for explanation of the decorative effect of the retroreflective sheet according to the present invention.
Figure 5B:
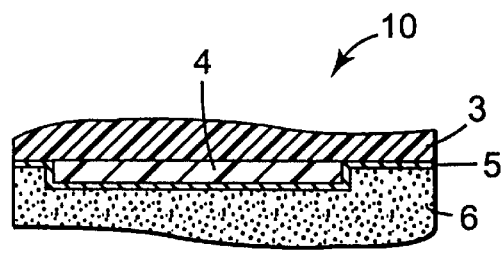
Figure 6:
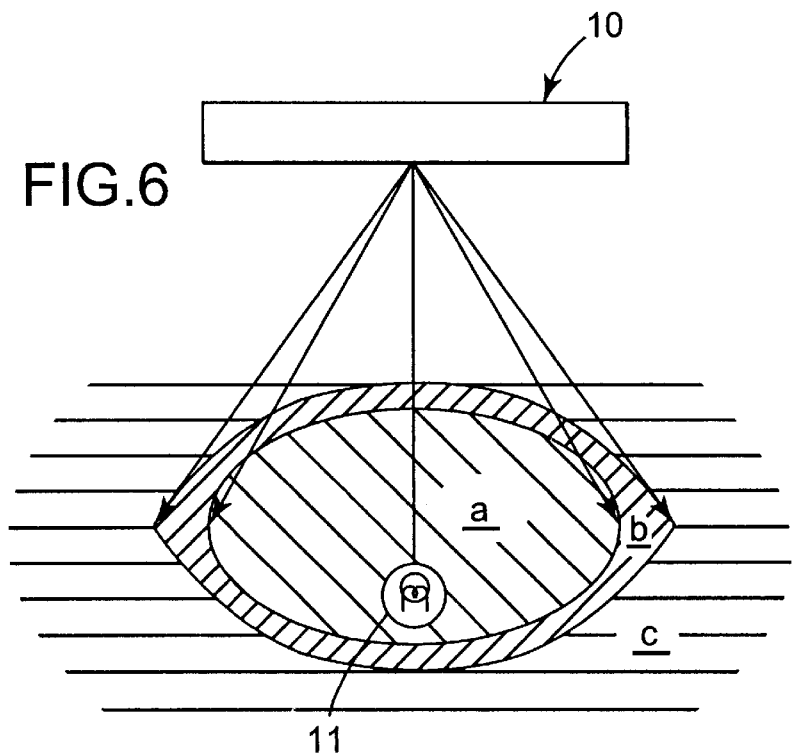
FIG. 6 is a schematic drawing illustrating the distribution of reflected light by the retroreflective sheet of FIG. 5.

The decorative effect and wide-angle observation effect of the light retroreflective sheet of the invention will be more easily understood by referring to the attached FIGS. 5–7.

Here, as shown in FIG. 5A, a pattern of focusing layer 4 of retroreflective sheet 10 was situated within a rectangle only at the center section A of sheet 10. As seen in FIG. 5B (the microspheres are not shown for simplicity), no focusing layer was formed in perimeter section B of the reflective sheet 10.

As shown in FIG. 6, when light is irradiated from a light source on the surface of the retroreflective sheet illustrated in FIG. 5, light is reflected across a wide angle as indicated by the arrows, and different patterns of this reflected light can be recognized by an observer over a wide angle. In the case illustrated in this drawing, different patterns may be recognized in the 3 different regions which are the center region a nearest light source 11, ring area b around it, and exterior region c outside of the ring. Strong reflection is observed at the center region a from the center section A of reflective sheet 10, while rainbow-like reflection is observed at ring area b from perimeter section B. The light source is indoor lighting in the case illustrated here, but the same retroreflective effect will be achieved with sunlight, street lamps or other light sources.

Figure 7A:
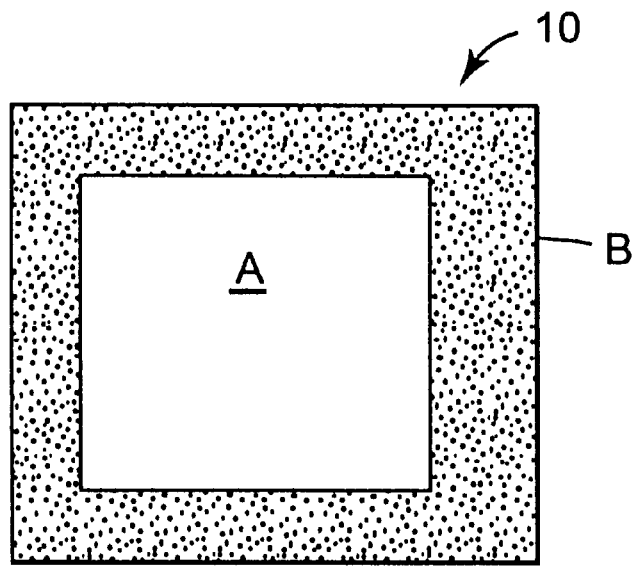
FIGS. 7A and 7B are plan views illustrating the decorative effect observed based on the distribution of reflected light in FIG. 6.
Figure 7B:
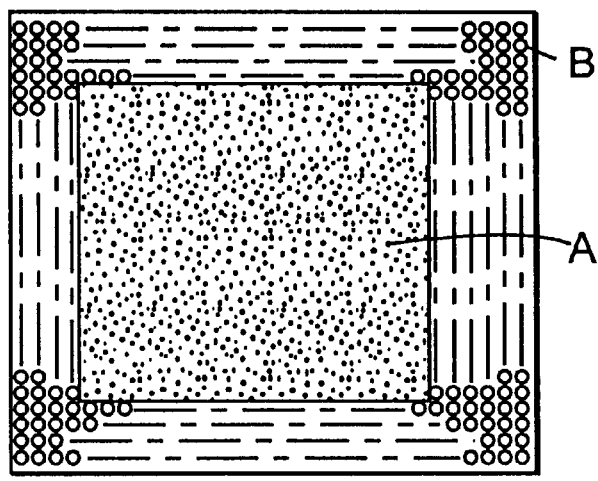

Thus, at the center region a of FIG. 6, center section A of sheet 10 appears bright while perimeter section B appears dark, as shown in FIG. 7A. At ring area b of FIG. 6, center section A of reflective sheet 10 appears dark while perimeter section B appears as a rainbow, as shown in FIG. 7B. However, at exterior region c of FIG. 6, neither the brightness/darkness nor rainbow of the other regions can be seen, and thus it appears colorless.

Finally, the findings of the present inventors may be generally summarized by stating that for an enclosed-lens type retroreflective sheet as described above, improvement of the retroreflective properties requires particular attention to be given to the following factors: (1) selection of high-quality microspheres with a uniform size (variation in size results in fewer focusing entities on the surface of the reflective layer) and (2) precise control of the film thickness and shape (pattern) of the focusing layer.

Further details of the invention are defined in the features of the claims.

EXAMPLES

The invention will be further explained by the following illustrative examples which are intended to be non-limiting.

Example 1

A cover film was formed from a polyvinyl chloride resin as follows. A plasticized vinyl chloride resin containing an ultraviolet absorber and thermostabilizer was applied in the form of an organosol solution to the surface of a paper liner precoated with an alkyd-based releasing agent, and dried. The resulting vinyl chloride film had a thickness of 68 $\mu$m.

A solution of a polyurethane resin, FL510 (tradename of Sumitomo 3M Co.) was applied on the surface of the support layer to form a semi-dry binder layer. Transparent microspheres with an average diameter of 71 $\mu$m and a refractive index of 2.26 were then dispersed in a cascade flow as a single layer on the surface of the semi-dry binder layer. The beads became embedded in the already formed binder layer to an extent of about 50 percent of their diameter. After dispersion of the glass beads, a polyvinyl butyral resin solution was applied with a bar coater on the binder layer at varied thicknesses as indicated, and dried so as to conform to shape of microspheres as shown. The drying conditions were adjusted depending on the film thickness. As shown in Table 1 below, a total of nine (9) different transparent focusing layers were formed having film thicknesses increasing at increments of 3 $\mu$m within a range of 0 to 24 $\mu$m.

Aluminum was then vapor deposited on the rear surface of the focusing layer and exposed rear surfaces of microspheres to a film thickness of 600 Å to form a reflective layer. An adhesive layer was then formed on the rear surface of the resulting reflective layer by applying and drying an adhesive consisting of an isooctyl acrylate-acrylic copolymer (copolymerization ratio: 90:10, average molecular weight: 400,000) on a paper liner coated with a silicone resin as a releasing layer, and laminating this onto the rear surface of the reflective layer.

After formation of the adhesive layer, the paper liner on the cover film was peeled off and the exposed surface of the cover film was coated with a clear coat using a composition containing a polyester polyol and polyisocyanate curing agent. The coated paint solution was allowed to dry to give a clear layer with a thickness of 20 $\mu$m.

Each of the nine (9) light retroreflective sheets were illuminated at an incident angle of 90° with light rays from a light source (60 W incandescent lamp) situated at a distance of 2 m from the reflective sheet. An observer at a distance 2 m from the reflective sheet moved around the light source as the center, and a record was made of the maximum observation angle (degrees) with respect to the incident angle, at which retroreflected light was visually detected. The results of the measurement are listed in Table 1 below.

This measurement of the retroreflected light observation angle was repeated after changing the light source to sunlight. In this case, however, the recognizability of reflected light was confirmed at a distance 2 m from the reflective sheet with the sunlight coming from the back of the observer. The results of the measurement are listed in Table 2.

Example 2

The process described in Example 1 was repeated except a 270 mesh silk screen printing machine was used instead of a bar coater for formation of the focusing layer. Also, the formation of the reflective layer thereafter was accomplished by, instead of vapor deposition of aluminum, printing a mixture of polyvinyl butyral resin and aluminum powder (SAP2171N tradename, product of Showa Aluminum Powder Co.) at a solid portion ratio of 1:9, to a thickness of 2 μm using a 270 mesh silk screen printing machine. The results of the measurement are shown in the Tables 1 and 2.

TABLE 1

| Thickness of focusing layer | Observation angle in Example 1 (relative to incident angle) | Observation angle in Example 2 (relative to incident angle) |
| --- | --- | --- |
| 0 μm | 42° (rainbow) | 42.5° (rainbow) |
| 3 μm | 40° (faint rainbow) | 41.5° (faint rainbow) |
| 6 μm | 33° | 33.5° |
| 9 μm | 28.5° | 28.5° |
| 12 μm | 25.5° | 25.5° |
| 15 μm | 21.5° | 19.5° |
| 18 μm | 19° | 16.5° |
| 21 μm | 14° | 13° |
| 24 μm | 8.5° | 10.5° |

With all of the reflective sheets listed in Table 1, an observation angle of 45° or greater permitted no observation of either retroreflected light nor rainbow colors, under any conditions.

TABLE 2

| Thickness of focusing layer | Sheet of Example 1 | Sheet of Example 2 |
| --- | --- | --- |
| 0 μm | Rainbow, no observation of reflected light of same color as sunlight | same as Example 1 |
| 3 μm | Reflected intensity faint and somewhat difficult to detect | same as Example 1 |
| 6 μm | Reflected light detected | same as Example 1 |
| 9 μm | Reflected light detected | same as Example 1 |
| 12 μm | Reflected light detected | same as Example 1 |
| 15 μm | Reflected light detected | same as Example 1 |
| 18 μm | Detectable, but within a very narrowly limited range | same as Example 1 |
| 21 μm | Difficult to detect due to blockage of sunlight by observer | same as Eample 1 |
| 24 μm | Difficult to detect due to blockage of sunlight by observer | same as Example 1 |

As discussed above, the invention provides a decorative, retroreflective sheet that exhibits excellent decorative effect irrespective of the time of day or night. In addition, the decorative effect of this retroreflective sheet may be achieved regardless of the angle of incident light, to give changing color tones while providing decoration appearing as a beautiful shining rainbow dispersion spectrum. Furthermore, retroreflective sheets of the invention also have a wide observation angle within which the decorative effect may be seen. For example, as the observation angle gradually widens from near the light source, the sections with the focusing layer reflect strongly in the small observation angle regions, thus causing the sections with the focusing layer to appear retroreflectively bright. As the observation angle widens approaching 42°, the retroreflected light disappears from the sections with the focusing layer, and the sections without the focusing layer reflect rainbow colors. In this case, the sections without the focusing layer appear as bright rainbow colors.

Various modifications and alterations of this invention will become apparent to those skilled in the art without departing from the scope and spirit of this invention.

What is claimed is:

1. A retroreflective sheet comprising, in order, a binder layer in the back side of which a plurality of microspheres, arranged in a monolayer, are partially embedded, a focusing layer underlying some of said microspheres, and a reflective layer underlying said focusing layer and underlying microspheres which do not have a focusing layer therebehind, wherein said focusing layer has a film thickness selection coefficient x in the range of 0.16 to 0.95 as defined by equation (II) of the following equations (I) and (II):

$$f = \frac{n_s(n_g - 2n_b)}{2[n_b(n_s - n_g) + n_s(n_b - n_g)]} \quad (I)$$

$$x = \frac{h}{df} \quad (II)$$

wherein f is the coefficient for the optimum layer thickness of said focusing layer, d is the diameter of said microspheres, h is the thickness of said focusing layer, $n_b$ is said refractive index of the binder layer, $n_g$ is the refractive index of the microspheres, and $n_s$ is the refractive index of said focusing layer.

2. The sheet of claim 1 further comprising a cover film on the front surface of said binder layer.

3. The retroreflective sheet of claim 1 further comprising an adhesive on the rear side thereof.

4. The retroreflective sheet of claim 1 wherein said reflective layer is either a vapor deposition coating of metal or a coating of a resin containing metal powders.

5. The retroreflective sheet according to any of claims 1 to 4 characterized in that the pattern of said focusing layer is one formed by a screen printing method.

* * * * *